United States Patent
Geislinger

[11] 3,726,108
[45] Apr. 10, 1973

[54] ELASTIC COUPLING
[76] Inventor: Leonhard Geislinger, Hofelgasse 26, Salzburg, Austria
[22] Filed: Apr. 22, 1971
[21] Appl. No.: 136,539

[30] Foreign Application Priority Data

Apr. 27, 1970 Austria..............................A 3803/70

[52] U.S. Cl..................................64/15 R, 64/27 L
[51] Int. Cl................................................F16d 3/56
[58] Field of Search......................64/15 R, 15 B, 12, 64/27 L

[56] References Cited

UNITED STATES PATENTS

| | | |
|---|---|---|
| 2,580,781 | 1/1952 | Hoffer.......................................64/12 |
| 3,004,409 | 10/1961 | Grey..........................................64/12 |
| 1,893,593 | 1/1933 | Oechsle.....................................64/12 |
| 2,551,837 | 5/1951 | Holloway..............................64/12 X |
| 2,561,117 | 7/1951 | Hoffer.......................................64/12 |
| 2,821,071 | 1/1958 | Tetlow.......................................64/15 |

Primary Examiner—Kenneth W. Sprague
Attorney—Kurt Kelman

[57] ABSTRACT

A plurality of flexible leaf springs, with pairs of intersecting, superposed springs, have their ends bolted to annular mounting flanges of a driving and a driven element for transmitting torque from the driving element rotating about an axis to the driven element. The leaf springs extend in respective planes perpendicular to the axis of rotation. The bolts are sufficiently tensioned to exert a holding pressure on the leaf spring ends sufficient to transmit the torque by friction.

12 Claims, 6 Drawing Figures

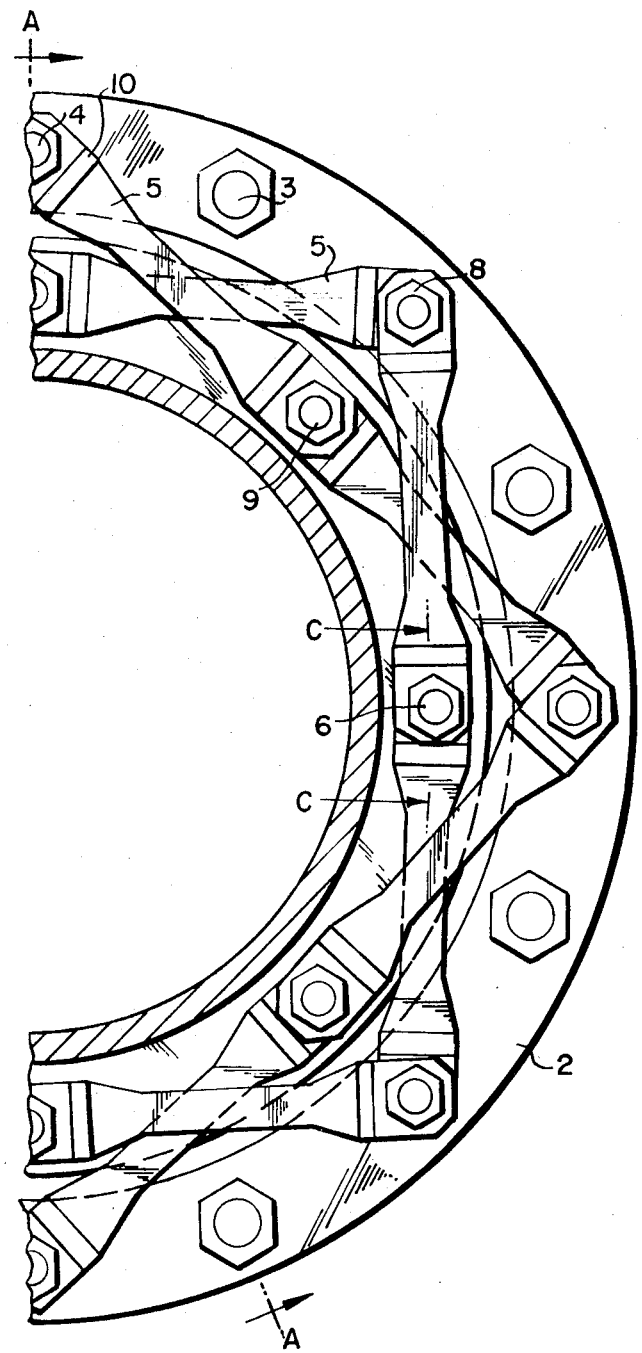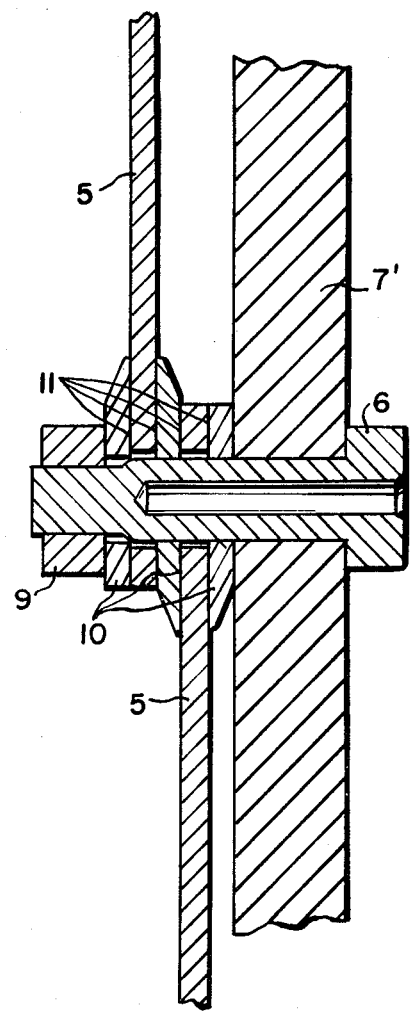
FIG.2
FIG.4
INVENTOR.
LEONHARD GEISLINGER

INVENTOR.
LEONHARD GEISLINGER

ELASTIC COUPLING

The present invention relates to improvements in an elastic coupling for transmitting torque from a driving element rotating about an axis to a driven element.

In known elastic couplings of this type, the annular mounting flanges of the driving and driven elements are flexibly coupled by a plurality of flexible leaf springs extending in respective planes substantially perpendicular to the axis of rotation of the driving element and approximately tangentially to one of the mounting flanges. Threaded bolts affix the two ends of each leaf spring to a respective one of the annular mounting flanges.

Since the leaf springs are flexible or elastic in a direction perpendicular to their planes, such a coupling makes it possible to transmit torque even if the axes of the coupled elements intersect in the plane of the coupling, i.e. it permits flexing of the axes in respect of each other. Also, if two such couplings are arranged at an axial distance from each other, displacement of the axes from a coaxial to a parallel relationship may also be compensated.

It is one primary object of this invention to improve elastic and flexible couplings of this type by increasing the torque load transmitted thereby without increasing the dimensions of its essential parts.

It has been found that the torque load which may be transmitted by such a coupling is limited primarily by the number of the fastening bolts and/or the nature of their fastening. In the conventional flexible couplings of this type, the number of threaded bolts per mounting flange is equal to the number of leaf spring fastening points at such flange. If the number of bolts is to be increased, while retaining the same dimensions, the length of the leaves must be reduced, which reduces their elasticity and thus the flexibility of the coupling. While this may be somewhat compensated by increasing the number of coupling springs, such an increase causes the total width of the coupling to be correspondingly increased, producing increased tensile and compression loads on the leaf springs.

These and other disadvantages are overcome in accordance with one aspect of the invention by mounting respective pairs of axially superposed leaf springs so that they intersect each other, as seen in the direction of the axis of rotation. When the annular mounting flanges extend in the same plane and the diameters of the flanges are of different size, the threaded bolts on the respective flanges define substantially coaxial circles of different diameters. The difference between the diameters of the circles exceeds the width of the leaf springs, and is preferably more than twice the width thereof. This arrangement makes it possible to arrange pairs of the threaded bolts affixing the leaf spring ends to the mounting flanges of the driving and driven elements, respectively, in the same radial planes. This means that, without changing the dimension, and more particularly the length, of the leaf springs, twice as many threaded bolts per flange may be used than in the conventional arrangement, thus doubling the torque load that may be transmitted by the coupling without changing its dimensions.

A further increase in the number of fastening bolts may be obtained by arranging two series of leaf springs, one series of springs being subject to tension and the other series of springs being subjected to compression during transmission of the torque, the leaf springs of each series being separately fastened.

According to another aspect of the present invention, a particularly dependable and durable fastening of the leaf spring ends to the mounting flanges is obtained if the bolts are tensioned sufficiently to exert a holding pressure on the leaf spring ends sufficient to transmit the torque by friction. This has the further advantage that the bores in the leaf springs receiving the bolt shafts may have a larger diameter than the bolts shafts, which greatly facilitates the assembly.

Long-term maintenance of the stress in the bolts will be assured if known expansion bolts are used as fastening bolts for the coupling of this invention. Also, the friction between the leaf springs and the leaf springs and mounting flanges may be increased by shot peening the leaf springs in a manner known per se, which will also increase their durability.

While it is known to interpose round washers or clamping plates between the leaf springs and/or the leaf springs and mounting flanges, the stresses coming from the flexing of the leaf springs will be favorably influenced at the fastening points if the clamping plates are bevelled at the end extending outwardly from the fastening bolt. Further improvement of the fastening will be obtained if washers of a material softer than the leaf spring steel are interposed between the leaf springs and the clamping plates.

The flexing stresses in the leaf springs may be reduced according to one feature of this invention if each elongated leaf spring of the coupling has a reduced width intermediate its fastened ends.

In service, it is very useful if the leaf springs of the coupling may be readily replaced and if this may be done by withdrawing the coupling parts in a radial direction without having to tamper with the driving and/or driven element. This is accomplished according to another preferred feature of the invention by fastening the leaf springs to coplanar mounting faces of the respective mounting flanges, rather than affixing them therebetween, i.e. between facing mounting faces of the flanges.

The above and other objects, advantages and features of the present invention will become more apparent from the following detailed description of two preferred embodiments thereof, taken in conjunction with the accompanying drawing wherein FIG. 1 is a longitudinal section along line A—A of FIG. 2 of one embodiment of flexible coupling according to this invention;

FIG. 2 is a transverse cross section along line B—B of FIG. 1, showing one half of the coupling, the non-illustrated half thereof being symmetrical to the illustrated half;

FIG. 4 is a longitudinal section along lines C—C of FIG. 2, showing a preferred fastening of the ends of the leaf springs at the junction of FIG. 3;

Figures 1, 3:
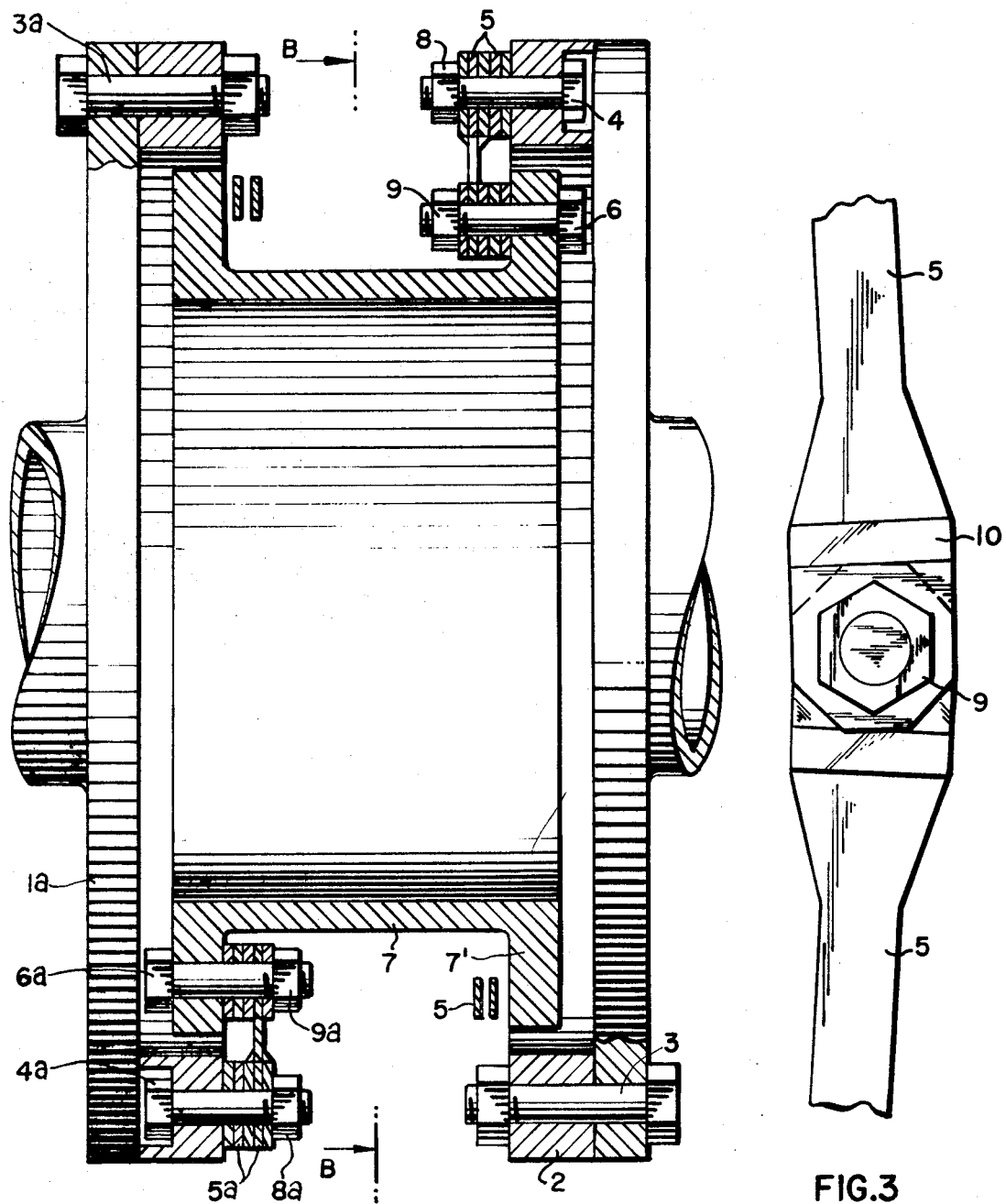
FIG. 3 is an enlarged top view of a junction of a pair of adjacent leaf springs of the coupling of FIGS. 1 and 2.

Referring now to the drawing and first to FIGS. 1 to 4, there are shown a driving element 1 and a driven element 1a. The elements are illustrated as shafts provided with end flanges, and the driving element 1 rotates about an axis. Respective annular mounting flanges 2 and 2a are fastened to the respective end flanges of the driving and driven element by bolts 3 and 3a, respectively. As will be best seen in FIG. 1, a coupling ring 7 is arranged between the end flanges of the driving and driven elements. The coupling ring comprises a skirt portion extending in an axial direction, and having mounting flange portions 7' radially projecting therefrom and coplanar with the annular mounting flanges 2 and 2a, respectively. In this manner, mounting flanges have coplanar mounting faces to which the leaf spring ends of the elastic coupling are affixed.

The elements 1 and 1a are elastically coupled for transmitting torque from element 1 to element 1a by a plurality of elongated flexible leaf springs 5, 5a each extending in a plane substantially perpendicular to the axis of rotation of element 1 and, as best seen in FIG. 2, approximately tangential to the mounting flange 7'. In this manner, the leaf springs form chords of the mounting flange 2. The two ends of each leaf spring are respectively affixed to the mounting flanges 2 and 7', and 2a and 7', by threaded necked-down bolts 4, 4a and 6, 6a.

As will be noted from FIG. 2, the mounting flanges for the respective ends of each leaf spring have diameters of different size, the mounting flange 2 substantially concentrically surrounding the mounting flange 7'. The threaded fastening bolts 4, 4a and 6, 6a for the respective leaf spring ends define circles of different diameters, which are also substantially concentric, and the difference between the diameters of the fastening bolt circles exceeds the width of the leaf spring, being more than double the central width of the leaf springs in the illustrated embodiment. As will also be noted from FIG. 2, respective pairs of superposed leaf springs 5 intersect each other, as seen in the axial direction.

Pairs of threaded fastening bolts 4, 6 affix the leaf spring ends to the mounting flanges 7' and 2 in the same radial plane. Each leaf spring has a reduced width intermediate the fastened ends thereof.

In the arrangement of FIG. 2, the coupling is shown to consist of two series of interleaved leaf springs 5, 5a, the ends of adjacent leaf springs of each series being affixed to a respective mounting flange 2 or 2a and 7' by one threaded bolt.

As will be appreciated from viewing FIG. 1, the coupling leaf springs are mounted on the coplanar mounting faces of the mounting flanges 2 and 7' and 2a and 7', the heads of the fastening bolts 4 and 6 being accommodated in corresponding recesses in the end flange of driving element 1. Thus, when the nuts 8 and 9 are removed from the bolts, the leaf springs and the clamping plates and washers may be readily removed, i.e. the coupling may be disassembled, without tampering with any other parts of the assembly. If the bolts 3 and 3a are also removed, the entire coupling may be radially removed without disturbing or displacing the elements 1 and 1a.

The fastening of the leaf spring ends at their junctions are best shown in enlarged FIGS. 3 and 4. One of the ends of the leaf springs 5, 5a is seen affixed to the mounting flange 7', with clamping plates 10 being interposed between the adjacent leaf springs as well as the leaf springs and the mounting flange 7' and nut 9, respectively. As will be noted, the clamping plates are bevelled in the direction of the longitudinal extension of the leaf springs. Furthermore, thin sheet metal washers 11, for instance of brass, are interposed between the clamping plates and the leaf springs. The bores of the leaf springs and the clamping plates, through which the bolts shaft extends, have a diameter larger than that of the bolt shaft so that the tensile and stress forces in the springs must be transmitted by friction only.

Figure 6:
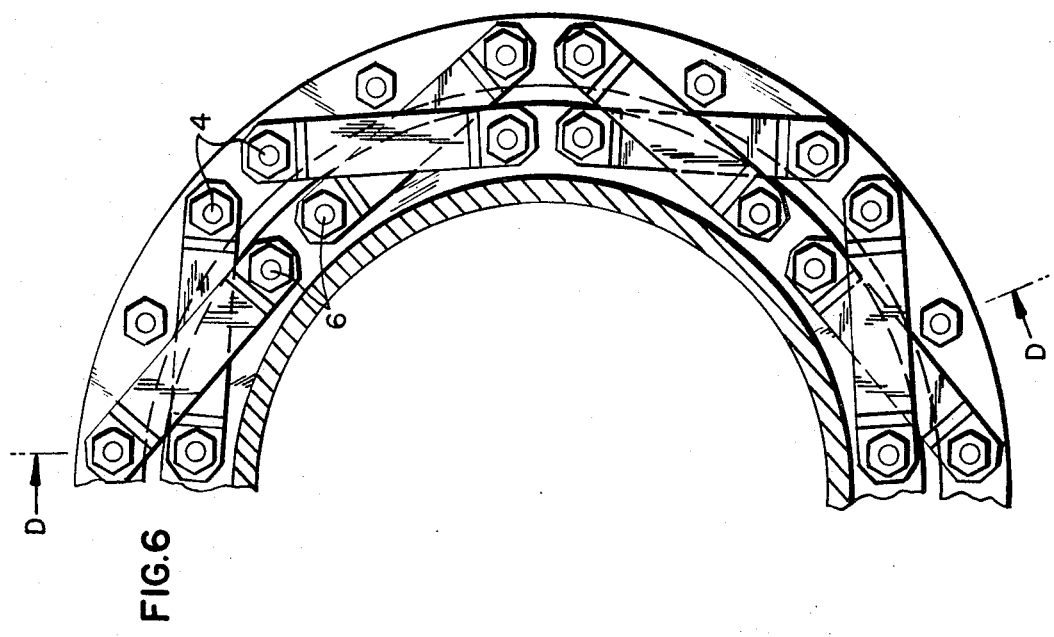
FIG. 6 is a transverse section along line E—E of FIG. 5, similar to the showing of FIG. 2.
Figure 5:
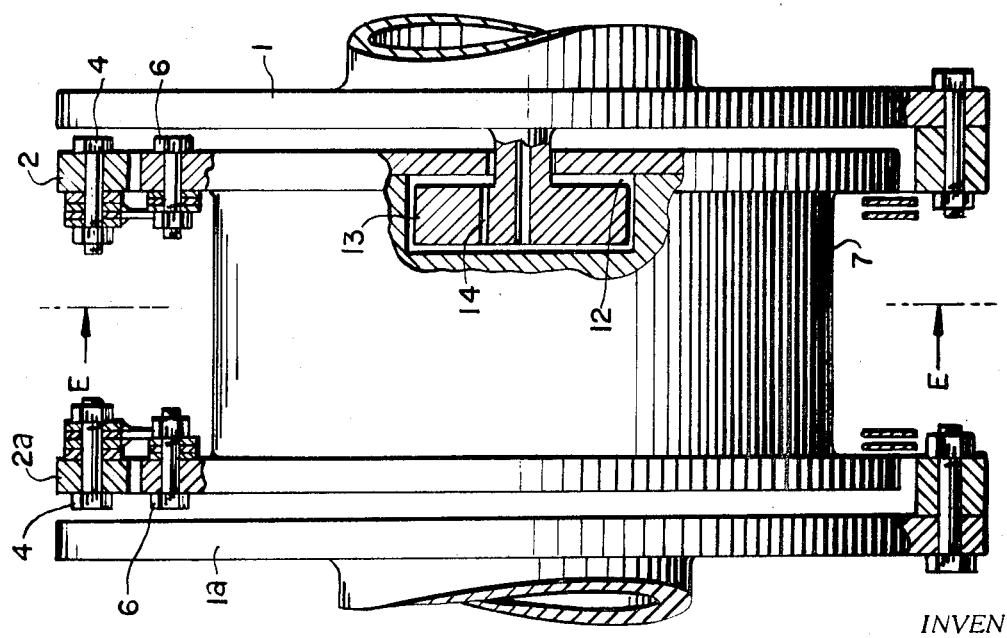
FIG. 5 is a longitudinal section along line D—D of FIG. 6 of another embodiment of the elastic coupling.

In the embodiment of FIGS. 5 and 6 like reference numerals are used to designate like parts functioning in a like manner to avoid redundancy in the description.

In contrast to the embodiment of FIGS. 1 and 2, each leaf spring in each series of springs, one being subjected to tension and the other to compression during transmission of the torque, is separately fastened to the respective mounting flange of the coupling ring and the mounting flanges 2, 2a by bolts 4, 6 and 4a, 6a, respectively.

As will be appreciated, the coupling ring 7 interposed between the driving and driven elements may be axially displaced. This displacement may cause axial oscillations in the coupling. The amplitude of the axial oscillations may be reduced by the damping means illustrated in FIG. 5. As shown, the coupling ring 7 defines a hydraulic fluid, i.e. oil, containing chamber 12 wherein a piston 13 fixedly connected to the end flange of the driving element 1 is mounted for axial movement in the chamber. A throttle bore 7 interconnects the two compartments of the chamber 12 defined by the piston so that, upon axial movement of the coupling ring 7 in respect of driving element 1, hydraulic fluid is displaced through the bore from one compartment to the other. This effectively dampens axial oscillations of the coupling.

While the invention has been described in connection with certain now preferred embodiments, it will be clearly understood that the same are merely illustrative of the principles of this invention whose scope is defined by the appended claims.

I claim:

1. A flexible coupling for transmitting torque from a driving element rotating about an axis to a driven element, each of the elements having an annular mounting flange, the coupling comprising a plurality of flexible leaf springs extending in respective planes substantially perpendicular to the axis of rotation of the driving element and approximately tangentially to one of the mounting flanges, each leaf spring having two ends, threaded bolts affixing the ends of each leaf spring to a respective one of the annular mounting flanges, and the improvement comprising means for damping oscillations of the coupling in the direction of the axis, and the leaf springs being arranged in pairs of axially superposed, intersecting leaf springs.

2. The flexible coupling of claim 1, wherein the annular mounting flanges extend in the same plane, the diameters of the flanges being of different size and the threaded bolts on the respective flanges defining circles of different diameters, the difference between the diameters of the circles exceeding the width of the leaf springs.

3. The flexible coupling of claim 2, wherein pairs of the threaded bolts affixing the leaf spring ends to the mounting flanges are arranged in the same radial planes.

4. The flexible coupling of claim 1, comprising two series of said leaf springs, one of the series of leaf springs being subjected to tension and the other series of leaf springs being subjected to compression during transmission of the torque, the ends of the leaf springs of each of the series being affixed to a respective one of the mounting flanges by separate ones of said threaded bolts.

5. The flexible coupling of claim 1, wherein the oscillation damping means comprises a hydraulically actuated piston movable in the direction of the axis.

6. The flexible coupling of claim 1, further comprising a coupling ring axially interposed between the driving and driven element, the coupling ring having annular mounting flanges at the respective ends thereof, two coplanar mounting flanges substantially concentrically surrounding the mounting flanges of the coupling ring and affixed to the driving element and to the driven element, respectively, and the leaf springs being affixed to the coplanar mounting flanges.

7. A flexible coupling for transmitting torque from a driving element rotating about an axis to a driven element, each of the elements comprising an annular mounting flange, the coupling comprising a plurality of flexible leaf springs extending in respective planes substantially perpendicular to the axis of rotation of the driving element, each leaf spring having two ends, threaded bolts affixing the ends of each leaf spring to a respective one of the annular mounting flanges, and the improvement comprising a clamping plate interposed between respectively adjacent leaf springs and between a respective one of the mounting flanges and an adjacent leaf spring, one end of the clamping plates being bevelled and the bolts being tensioned sufficiently to exert a holding pressure on the leaf spring ends sufficient to transmit the torque by friction.

8. The flexible coupling of claim 7, wherein said bolts are necked-down bolts.

9. The flexible coupling of claim 7, wherein the leaf springs are ball blasted.

10. The flexible coupling of claim 7, further comprising washers of a material softer than that of the clamping plates interposed between respectively adjacent clamping plates and leaf springs.

11. The flexible coupling of claim 7, wherein each of the leaf springs has a reduced width intermediate the ends thereof.

12. The flexible coupling of claim 7, wherein the mounting flanges have coplanar mounting faces to which the leaf spring ends are affixed.

* * * * *